(12) United States Patent  
Chen et al.

(10) Patent No.: US 8,581,900 B2
(45) Date of Patent: Nov. 12, 2013

(54) COMPUTING TRANSITIONS BETWEEN CAPTURED DRIVING RUNS

(75) Inventors: Billy P. Chen, Bellevue, WA (US); Michael F. Cohen, Seattle, WA (US); Eyal Ofek, Redmond, WA (US); Blaise H. Aguera y Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 12/482,238

(22) Filed: Jun. 10, 2009

(65) Prior Publication Data

US 2010/0315411 A1     Dec. 16, 2010

(51) Int. Cl.
*G06T 15/00*     (2011.01)

(52) U.S. Cl.
USPC ............ 345/419; 345/420; 345/440; 345/473

(58) Field of Classification Search
USPC .................. 345/419, 420, 440, 473
See application file for complete search history.

(56) References Cited

U.S. PATENT DOCUMENTS

| | | | |
|---|---|---|---|
| 7,356,405 B1 | 4/2008 | Nesbit | |
| 7,395,153 B1 | 7/2008 | Nesbitt et al. | |
| 7,440,875 B2 | 10/2008 | Cuthbert et al. | |
| 7,711,478 B2 * | 5/2010 | Gluck | 701/436 |
| 7,933,395 B1 * | 4/2011 | Bailly et al. | 379/201.04 |
| 7,933,929 B1 * | 4/2011 | McClendon et al. | 707/802 |
| 2004/0176907 A1 | 9/2004 | Nesbitt | |
| 2005/0128212 A1 * | 6/2005 | Edecker et al. | 345/582 |
| 2006/0132482 A1 * | 6/2006 | Oh | 345/419 |
| 2006/0235610 A1 | 10/2006 | Ariyur et al. | |
| 2008/0094250 A1 | 4/2008 | Myr | |
| 2008/0143709 A1 * | 6/2008 | Fassero et al. | 345/419 |
| 2009/0043486 A1 | 2/2009 | Yang et al. | |
| 2010/0118116 A1 * | 5/2010 | Tomasz et al. | 348/36 |
| 2011/0214072 A1 * | 9/2011 | Lindemann et al. | 715/757 |

FOREIGN PATENT DOCUMENTS

| | | | |
|---|---|---|---|
| EP | 1867952 A1 | 12/2007 | |
| EP | 1988362 A1 | 11/2008 | |

OTHER PUBLICATIONS

I. C.M. Flinsenberg "Route Planning Algorithms for Car Navigation". Published 2004.*
Choi et al. "Planning Biped Locomotion using Motion Capture Data and Probabilistic Roadmaps". ACM 2002.*

(Continued)

*Primary Examiner* — Kimbinh T Nguyen
(74) *Attorney, Agent, or Firm* — Wolfe-SBMC

(57) ABSTRACT

Various embodiments provide a global approach for computing transitions between captured runs through an intersection. In accordance with one or more embodiments, a transition algorithm receives as input various runs that have been captured through an intersection and an input path through the intersection. The transition algorithm processes its inputs and provides, as an output, a set of points and data such as a direction associated with each of the points. The set of points includes points from different captured runs. The output set of points and associated data indicate which images to obtain from a database and which field of view to create a simulated turn for the user.

18 Claims, 11 Drawing Sheets

(56) References Cited

OTHER PUBLICATIONS

Sotelo, et al., "VIRTUOUS: Vision-Based Road Transportation for Unmanned Operation on Urban-Like Scenarios", Retrieved at <<http://ieeexplore.ieee.org/stamp/stamp.jsp?arnumber=01303538>>, IEEE Transactions on Intelligent Transportation systems, vol. 5, No. 2, Jun. 2004, pp. 69-83.

Brakatsoulas, et al., "On Map-Matching Vehicle Tracking Data", Retrieved at <<http://www.vldb2005.org/program/paper/fri/p853-brakatsoulas.pdf>>, Proceedings of the 31st VLDB Conference, 2005, pp. 853-864.

Curtispath, Andrew Bruce, "Planning for Unmanned Air and Ground Vehicles in Urban Environments", Retrieved at http://contentdm.lib.byu.edu/ETD/image/etd2270.pdf>>, Apr. 2008, pp. 141.

Gracias, Nuno et al., "Mosaic Based Navigation for Autonomous Underwater Vehicles", *IEEE Journal of Ocean Engineering*, vol. 28, Issue 4, Available at <http://citeseerx.ist.psu.edu/viewdoc/download;jsessionid=921B9EB62E2EFAD9F60C415DCD3282-5B?doi=10.1.1.3.2613&rep=rep1&type=pdf.>,(Oct. 2003), pp. 1-14.

* cited by examiner

COMPUTING TRANSITIONS BETWEEN CAPTURED DRIVING RUNS

BACKGROUND

Mapping software, such as online mapping software, can allow a user to virtually navigate through a realistically-captured landscape. For example, a vehicle equipped with one or more cameras can typically drive through a landscape, such as various streets and roads, and capture images along the landscape. These images can then formulate the basis through which mapping software can enable a user to virtually navigate along the images that have been captured along the landscape. This can provide the user with a realistic experience such as if the user were to walk or drive along the landscape.

As mapping software has evolved, so too has the sophistication with which images are captured and subsequently rendered for a user. For example, various providers such as the assignee of this application now provide 360° panoramic views, known as "bubbles," of various landscapes such as streets and roads. Users can, using suitably configured mapping software, navigate along such landscapes and be exposed to a very realistic 360° experience.

One of the challenges facing providers of this type of experience has to do with constraints associated with capturing images along various streets and roads. Specifically, due to time or capture conditions, some turns at various intersections may not have been captured. Yet, a user may wish to navigate along a turn for which images have not been specifically captured. For example, assume at a particular intersection that images have been captured along two runs. A first of the captured runs extends from south to north, and a second of the runs extends from west to south. The user may, however, wish to navigate from west to north. Because this run has not been specifically captured, some type of transition between captured runs should occur. Using a naïve approach, such as simply jumping between capture points on the different runs, can lead to a discontinuous and unrealistic transition and hence, an undesirable user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a global approach for computing transitions between captured runs through an intersection. In accordance with one or more embodiments, a transition algorithm receives as input various runs that have been captured through an intersection and an input path through the intersection. The transition algorithm processes its inputs and provides, as an output, a set of points and data such as a direction associated with each of the points. The set of points includes points from different captured runs. The output set of points and associated data indicate which images to obtain from a database and which field of view to create a simulated turn for the user.

BRIEF DESCRIPTION OF THE DRAWINGS

The same numbers are used throughout the drawings to reference like features.

DETAILED DESCRIPTION

Overview

Various embodiments provide a global approach for computing transitions between captured runs through an intersection. In accordance with one or more embodiments, a transition algorithm receives as input various runs that have been captured through an intersection and an input path through the intersection. The transition algorithm processes its inputs and provides, as an output, a set of points and data such as a direction associated with each of the points. The set of points includes points from different captured runs. The output set of points and associated data indicate which images to obtain from a database and which field of view to create a simulated turn for the user.

The transition algorithm can utilize continuous or discrete processing to obtain the simulated turn. In at least some embodiments, discrete processing is utilized to represent the transition algorithm's output in finite quanta. In one implementation, the discrete processing utilizes a weighted edge-directed graph. The graph includes nodes and directed edges that connect the nodes. The edges are weighted and the edge-directed graph is processed to compute a shortest path between a start node and an end node. The computed path provides a transition between the different captured runs.

In the discussion that follows, a section entitled "Operating Environment" describes but one environment in which the various embodiments can be employed. Following this, a section entitled "Captured Runs and a User-Specified Path" explains the notion of captured runs and a user-specified path. Next, a section entitled "Naïve Transition Approach" describes a naïve undesirable approach for effecting a transition between captured runs. Following this, a section entitled "Example Output Path" describes an example output path that can be provided in accordance with one or more embodiments. Next, a section entitled "Building A Weighted Edge-Directed Graph" describes how a weighted edge-directed graph can be built in accordance with one or more embodiments. Following this, a section entitled "Computing Distance Cost" describes how a distance cost is computed for the transition algorithm in accordance with one or more embodiments. Next, a section entitled "Computing Deviation Cost" describes how a deviation cost can be computed in accordance with one or more embodiments. Following this, a section entitled "Selecting a Path Using Distance and Deviation Costs" describes how a path can be selected in accordance with one or more embodiments. Next, a section entitled "Example Methods" describes example methods in accordance with one or more embodiments. Last, a section entitled "Example System" describes an example system that can be used to implement the various embodiments described herein.

Operating Environment

Figure 1:
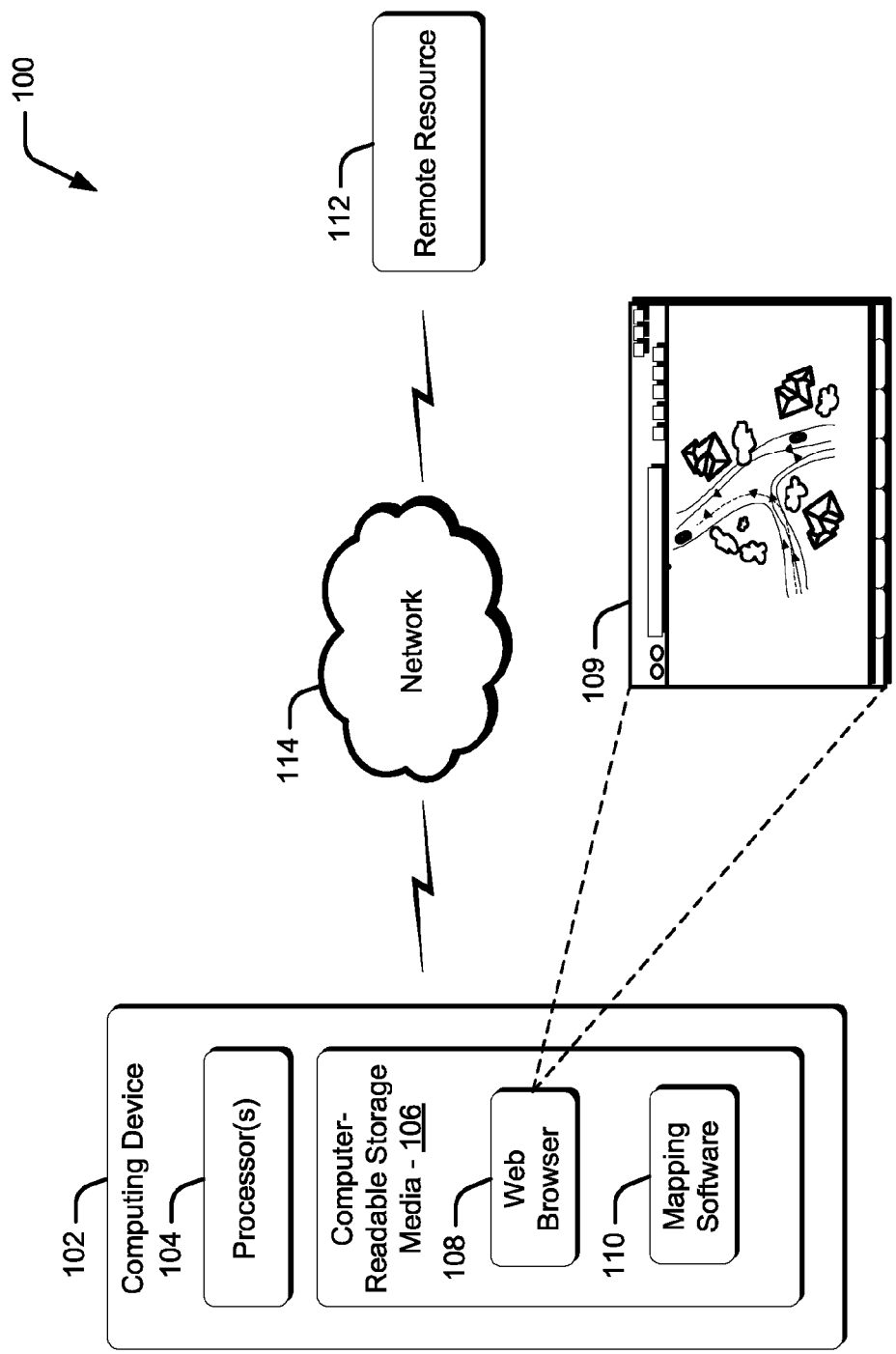
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 102 having one or more processors 104 and one or more computer-readable storage media 106. The computer-readable storage media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 11.

The computing device 102 also includes a web browser 108, as well as other applications, that can be operable to access, display, and/or interact with various types of navigable content. The web browser provides a user interface 109 that is operable to present (e.g., display) a visualization that can enable a user to navigate various content. For example, the user interface can enable a user to provide input that is utilized to select a transition-appropriate path through a captured landscape, such as one that includes streets and roads. Also included on the computing device 102 is mapping software 110 that can provide functionality that is described above and below. While the mapping software 110 is illustrated as separate from the web browser 108 (or other applications), it is to be appreciated and understood that, in some embodiments, the web browser 108 (or other applications) may include the mapping software 110.

The computing device 102 is configured to access one or more remote resources 112 via a network 114. The network 114 can include any suitable wired and/or wireless network, such as the Internet, a wide area network, a local area network, and so on. One example of a remote resource is a remote server that includes data and other information that can be utilized to provide a rendered representation in user interface 109. It is to be appreciated and understood that the techniques described herein, or aspects of the techniques, can be implemented by one or both of the client device 102 or remote resource 112.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of example captured runs and a user-specified path.

Captured Runs and a User-Specified Path

Figure 2:
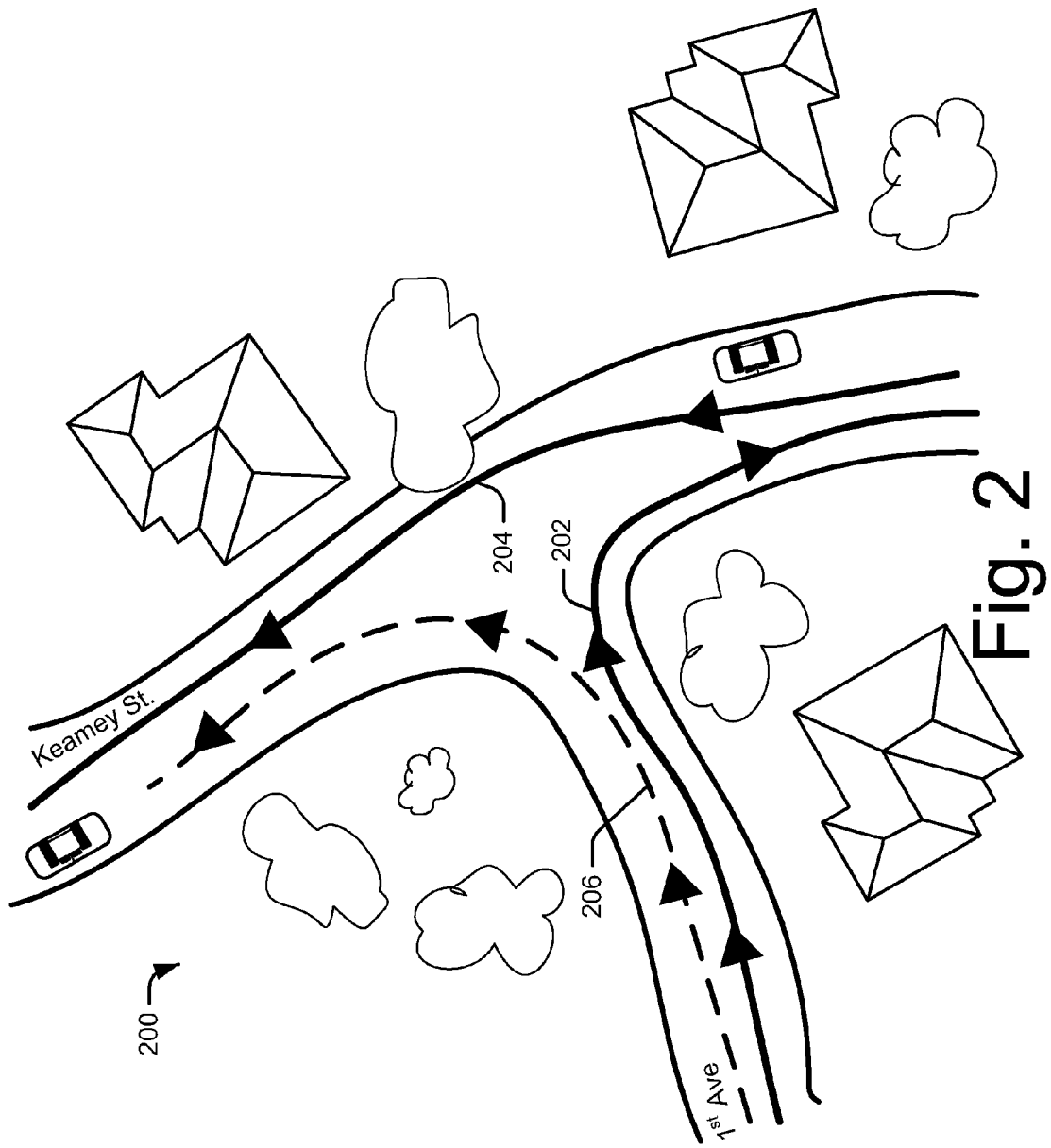
FIG. 2 illustrates a mapping user interface in accordance with one or more embodiments.

FIG. 2 illustrates a mapping user interface in accordance with one or more embodiments generally at 200. In this particular example two streets, $1^{st}$ Ave and Keamey St. are illustrated. Two example captured runs 202, 204 are shown, along with the direction of each run indicated by the arrows. The captured runs may or may not be displayed for the user. As such, the captured runs are shown for discussion purposes only. An input path is shown at 206 along with the direction of the input path. The input path can be specified in any suitable way, such as through input received from a user. The user may have specified the path by moving their cursor along the path as shown. In an alternative embodiment, the path may have been computed automatically by fitting a curve to the starting and ending conditions of the two paths. For example, a Hermite spline with tangent constraints at the start and end could be used.

In this particular example, a first of the captured runs, captured run 202, proceeds along $1^{st}$ Ave and turns right onto Keamey St. A second of the captured runs, captured run 204, proceeds along Keamey St. in the direction indicated. Notice, however, that the user-specified path 206 proceeds first along $1^{st}$ Ave and then turns left onto Keamey St. Notice also that there is not a single captured run that coincides with the user-specified path 206. In this case, a transition between captured runs 202, 204 will be computed as described below.

Recall from the discussion above that one naïve approach is to simply select the nearest points between two captured runs to affect a transition. This approach can, however, lead to an undesirable user experience. As an example, consider the discussion just below.

Naïve Transition Approach

Figure 3:
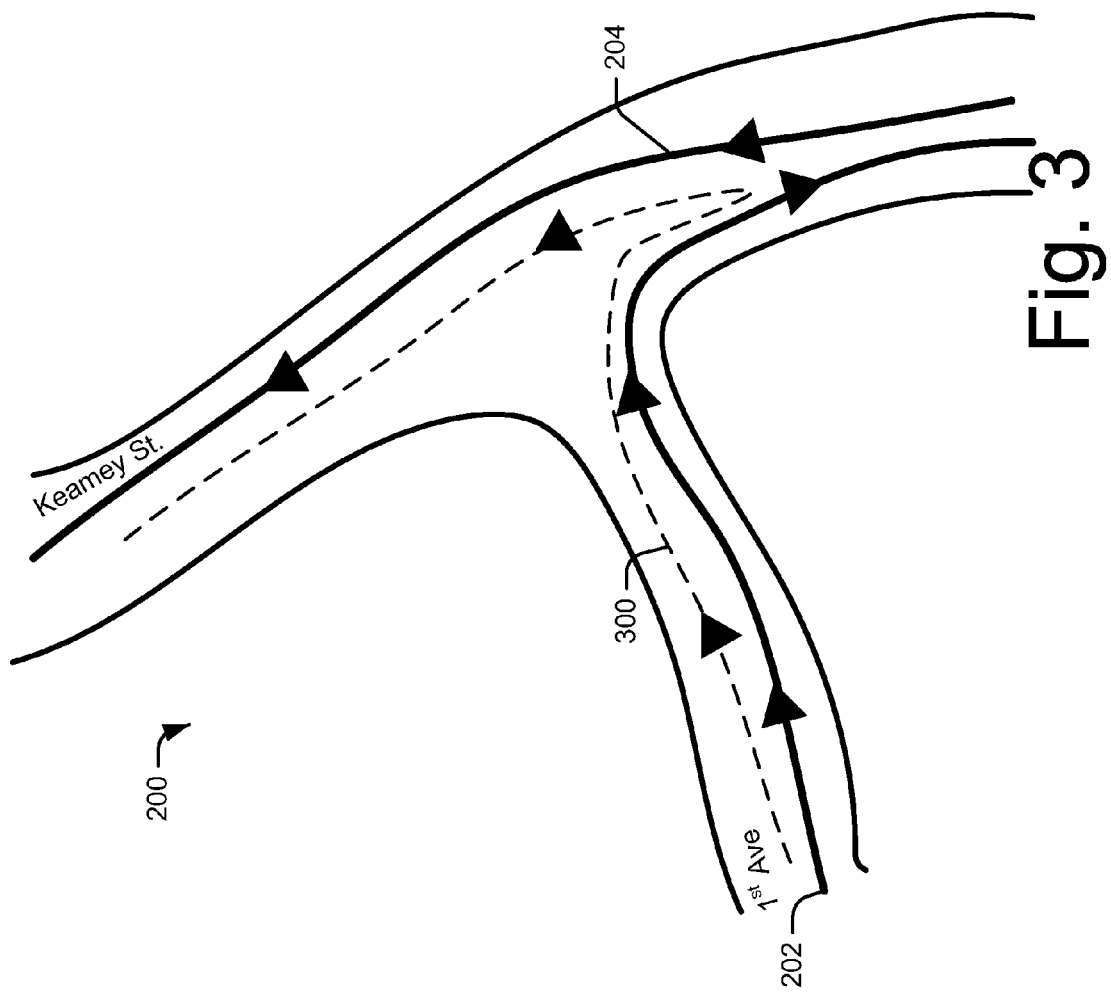
FIG. 3 illustrates an example of a naïve transition.

FIG. 3 illustrates an example of a naïve transition. In this example, the transition is made between captured runs 202, 204 at a location that coincides to the nearest pair of points on each respective captured run relative to the user-specified path of FIG. 2. Thus, an output path 300 associated with the user-specified path 206 (FIG. 2) actually turns right from $1^{st}$ Ave onto Keamey St. and then makes a u-turn to proceed in the desired direction along Keamey St. Needless to say, this provides a disjointed and generally inaccurate user experience.

Another naïve approach would be to set a turn radius "r" for a car. Given this radius, a circle of radius "r" could be fit to both runs. A path can then be defined that moves from $1^{st}$ Ave, then along the curve of the circle, and then to Keamey St. However, this path does not take into account image coverage and, as a result, the part of the path that follows the circle may not have any images to show even though such images may exist a short distance from the path.

In accordance with the embodiments described herein, an output path can be created that provides a more realistic user experience. As an example of such an output path, consider the discussion just below.

Example Output Path

Figure 4:
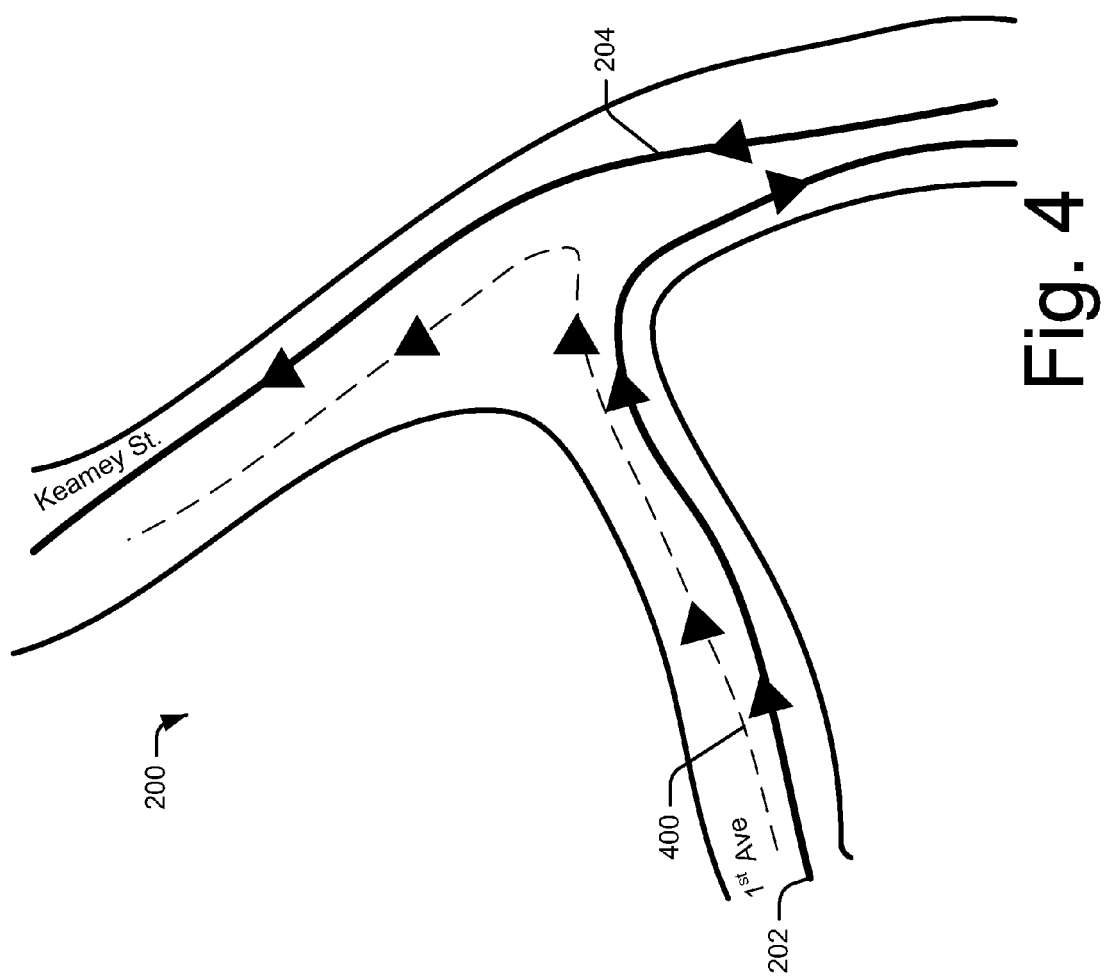
FIG. 4 illustrates an output path that has been computed in accordance with one or more embodiments.

FIG. 4 illustrates an output path 400 that has been computed in accordance with the techniques described herein. Notice in this example, that output path 400 mitigates the right turn/u-turn situation illustrated in FIG. 3. As will be described in detail below, the output path is computed by considering not only the distance between the two runs 202, 204, but a deviation from an ideal path associated with the user-specified path. To understand how output path 400 is computed in accordance with one or more embodiments, consider the discussion just below.

Building a Weighted Edge-Directed Graph

Figure 5:
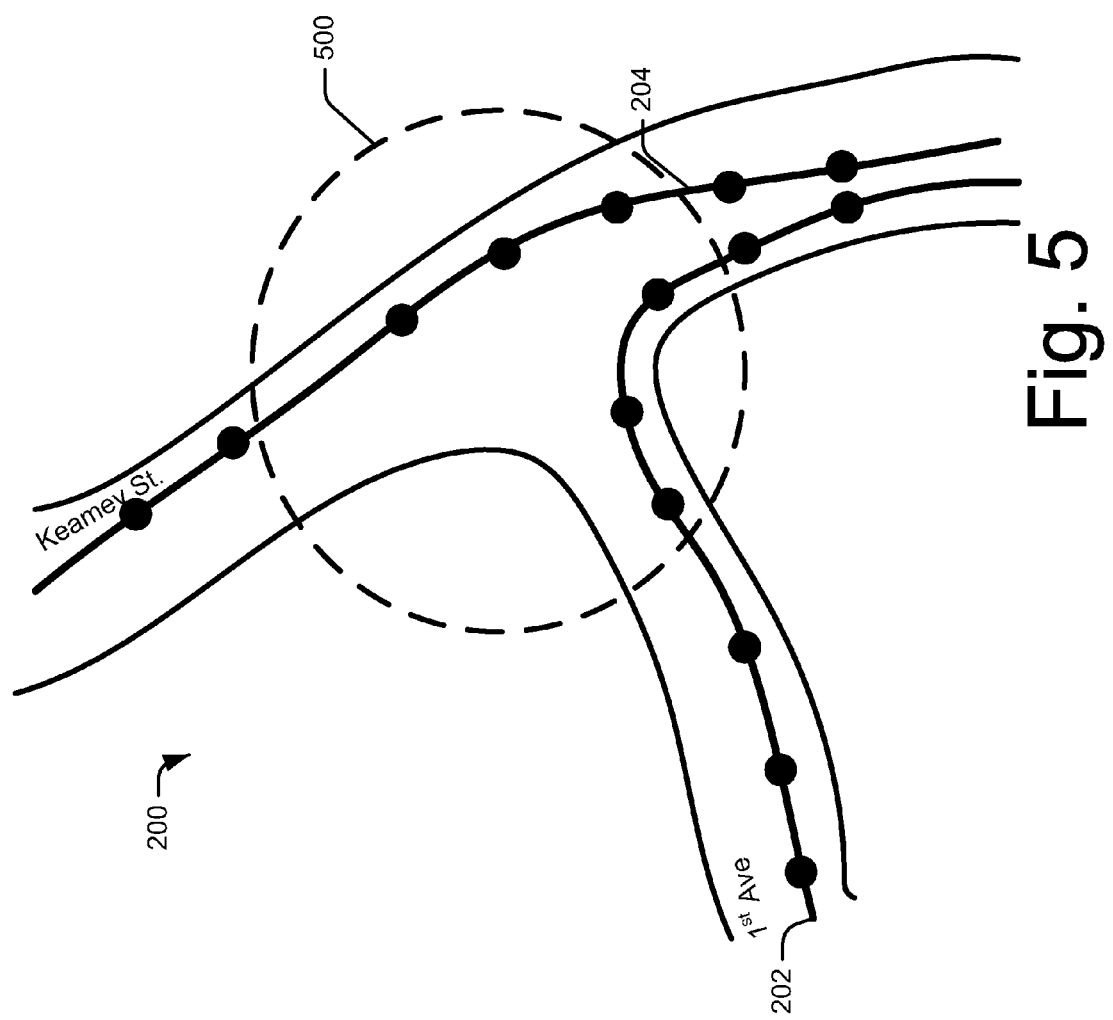
FIG. 5 illustrates aspects of a weighted, edge-directed graph in accordance with one or more embodiments.

In one or more embodiments, an output path is computed by using a transition algorithm that relies upon a weighted, edge-directed graph, a portion of which is shown in FIG. 5. In this particular example, the transition algorithm utilizes, as its input, two captured runs 202, 204. Each captured run includes a plurality of nodes (represented by the black dots), and weighted edges that connect adjacent nodes in the run (indicated by the lines between the black dots). Each node on a captured run represents a capture event where an image or other information was captured. In at least some embodiments, each capture event represents a location where a 360° panoramic view was captured. In one or more embodiments, each node can have various metadata associated with it, such as the time an associated image was captured, capture conditions, camera type that captured the image, Wi-Fi reception, cellular reception, temperature, pressure, street quality, and the like. In addition, the transition algorithm receives a user-specified path, such as the path described above.

In addition, the transition algorithm utilizes, as an input, a description of an associated intersection. In one or more embodiments, the description of the intersection can include the latitude and longitude of the intersection, as well as a radius that describes the size of the intersection, represented in FIG. 5 by the dashed circle 500. In the illustrated and described embodiment, the weight of each edge in a particular run is set to 0.

Figure 6:
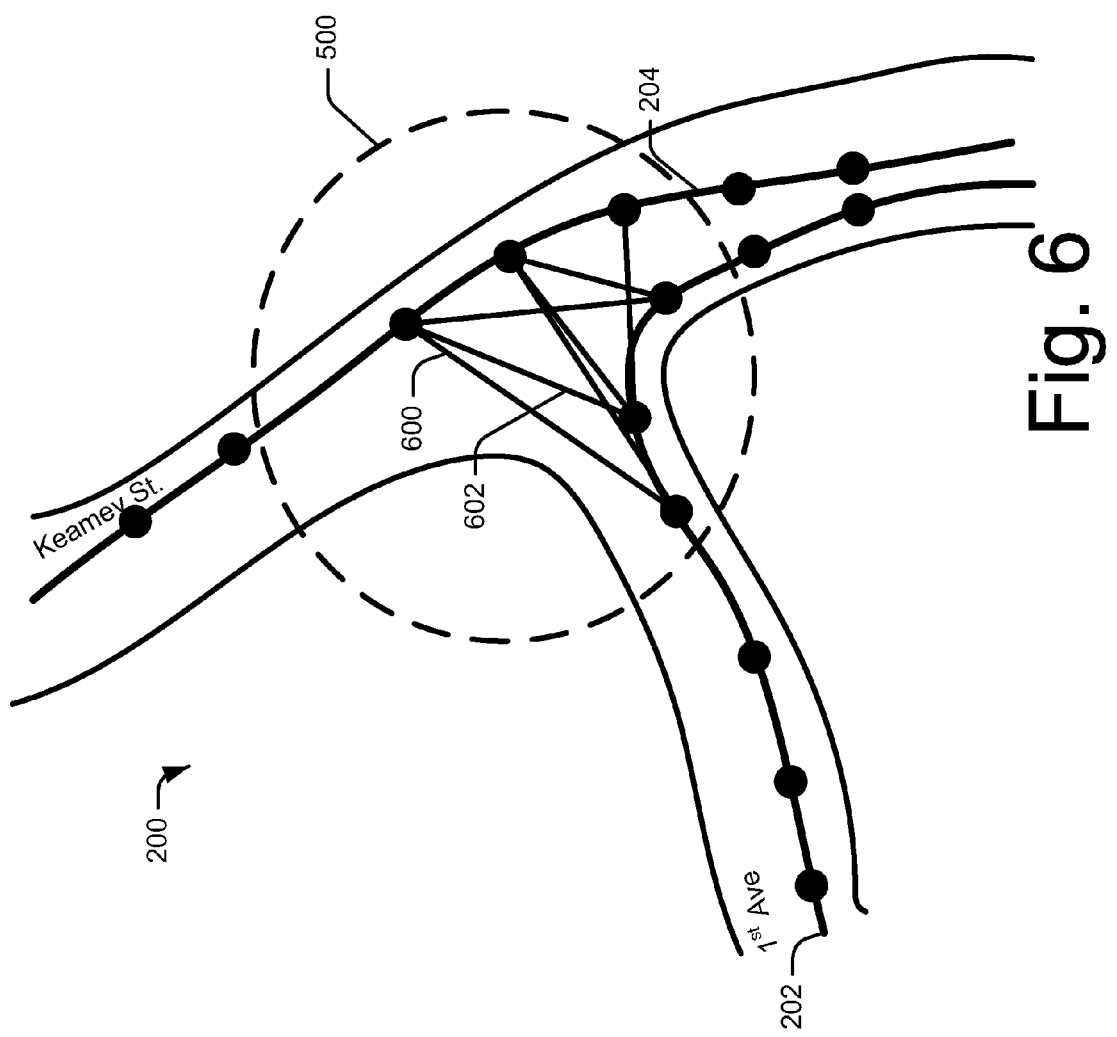
FIG. 6 illustrates aspects of a weighted, edge-directed graph in accordance with one or more embodiments.

Having constructed a graph that represents two captured runs having nodes associated with capture events and edges connecting adjacent nodes within a particular run, transition edges between nodes on different runs within the intersection are defined. As an example, consider FIG. 6. There, various transition edges between nodes on runs 202, 204 are shown, examples of which are illustrated at 600 and 602. This defines a set of potential transitions within the intersection. The purpose of defining transition edges is to be able to assign weights to the transition edges which can be used in computing an output path which constitutes a shortest path between a start node and an end node. The weights on the transition edges quantitatively describe the notion of distance and deviation as will become apparent below.

Computing Distance Cost

In one or more embodiments, a distance cost is computed and is associated with a distance between nodes on different runs. For example, in the FIG. 6 example, a distance cost is computed that describes the distance between the nodes associated with transition edge 600. A distance cost is computed for each of the transition edges within the intersection. Any suitable measure of distance can be used to compute the distance cost. In one or more embodiments, the distance cost is the Euclidian distance between two nodes connected by a transition edge. The intuition behind using distance cost in the transition algorithm is that large jumps between nodes on different runs may be less desirable than shorter jumps between the nodes on the different runs.

Having computed distance costs associated with the transition edges within the intersection, a deviation cost for each transition edge is now computed as described below, although such need not occur in the described order.

Computing Deviation Cost

The intuition behind using a deviation cost is that there is some desired curve that represents the smoothest, most accurate turn for a user's specified path. Specifically, when entering an intersection such as the one shown in FIG. 6, one essentially enters the intersection in a straight direction and leaves the intersection in a straight direction. The goal is to pick a transition such that when a turn is made, the turn is made in the correct direction. When nodes are selected for a particular transition, one wants to select the nodes such that the node selection is as close as possible to the direction of travel within the intersection.

Figure 7:
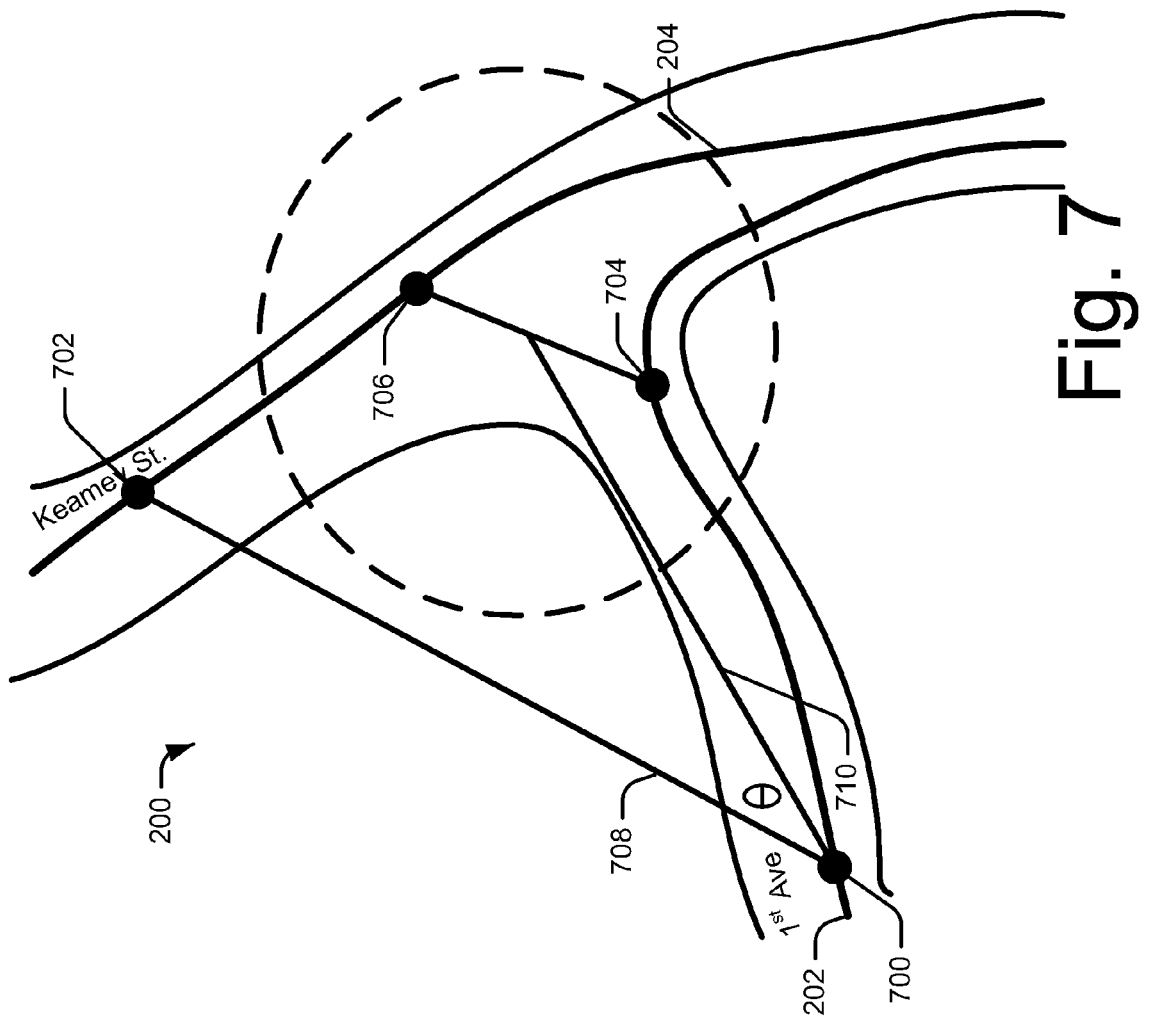
FIG. 7 illustrates aspects of a weighted, edge-directed graph in accordance with one or more embodiments.

FIG. 7 illustrates but one way of computing a deviation cost. In the example, a start node 700 and an end node 702 are selected outside of the intersection. In addition, a transition within the intersection is selected. In this particular example, the transition occurs between nodes 704 and 706. Next, two vectors are defined. A first vector 708 extends from start node 700 and terminates at end node 702. A second vector 710 extends from start node 700 and terminates relative to the transition under consideration. In the illustrated and described embodiment, the second vector 710 terminates midway between the transition edge connecting nodes 704, 706. Collectively, the first and second vectors define an angle $\Theta$.

A deviation cost is computed, as described above, for each transition under consideration. The intuition behind using angle $\Theta$ to compute the deviation cost is that one wants to minimize the angle $\Theta$ for a particular transition. By minimizing angle $\Theta$, one attempts to avoid turning in a direction other than an intended direction, for example, turning to the right in the figure.

It is to be appreciated and understood that other methods and techniques can be used for computing deviation costs without departing from the spirit and scope of the claimed subject matter. For example, deviation costs can be assessed in a manner that penalizes turns in a wrong direction, while rewarding turns in a correct direction. Penalties can be enforced by assigning higher weights to transition edges associated with turns in the wrong directions, while rewards can be provided by assigning lower weights to transition edges associated with turns in the right direction.

Further, in at least some embodiments, weights can be assigned in accordance with the type of junction at an intersection. For example, user perceptions can vary depending on the type of junction at an intersection. Typically, users will be more tolerant of bumps or jitters in an image when they are turning at a junction. Likewise, users will be less tolerant of bumps or jitters when they are proceeding straight through an intersection. As such, weights can be assigned in a manner that takes an account of changes of angles and jump distances so as to attempt to provide a desirable user experience as they navigate through a junction.

Selecting a Path Using Distance and Deviation Costs

Once distance and deviation costs have been computed as described above, the cost for a particular transition edge under consideration can be computed using the following formula:

$$\text{Cost}_{transition} = \text{Cost}_{Distance} + \text{Cost}_{Deviation}$$

It is to be appreciated and understood that costs associated with a particular transition edge can be computed in other ways and can consider other parameters. For example, cost functions can be employed that utilize parameters including, by way of example and not limitation, photometric differences in capture events (e.g., runs captured during the day and runs captured during night), time of the day when an image was captured, camera specification, image quality, image properties or characteristics such as color distribution, number of matches of objects between images in different capture events, image sharpness, freshness of photos (time difference between captures), and the like. Other costs could include the use of a geometric proxy. In this case, the proxy aids in the transition between two images. The better the proxy, the larger the transition without visual distortion.

Having computed cost functions for individual transition edges, a shortest path algorithm is run utilizing a start node before the intersection and an end node after the intersection. Any suitable shortest path algorithm can be used. In one or more embodiments, a shortest path algorithm in the form of Dijkstra's algorithm can be run. The output of the shortest path algorithm (i.e. the output path) is one that contains the smallest transition cost between the two captured runs as exemplified by the cost function above. As noted, however, cost functions can be employed that utilize other parameters without departing from the spirit and scope of the claimed subject matter.

Once the shortest path or output path has been computed, the transition algorithm knows which capture events or nodes to use in its formulation of the user's turn or path. Recall from the discussion above that in one or more embodiments, each capture event is associated with a 360° panoramic view. Thus, in these embodiments, a heading for each associated capture event can be computed. The headings are computed from metadata that is associated with each capture event. Accordingly, using the output path, a heading for each node can be computed to maintain a generally consistent view along the output path. The heading can then be used to select the appropriate panoramic view associated with each node.

Having considered an example of how transitions can be computed in accordance with one or more embodiments, consider now some example methods in accordance with one or more embodiments.

Example Methods

Figure 8:
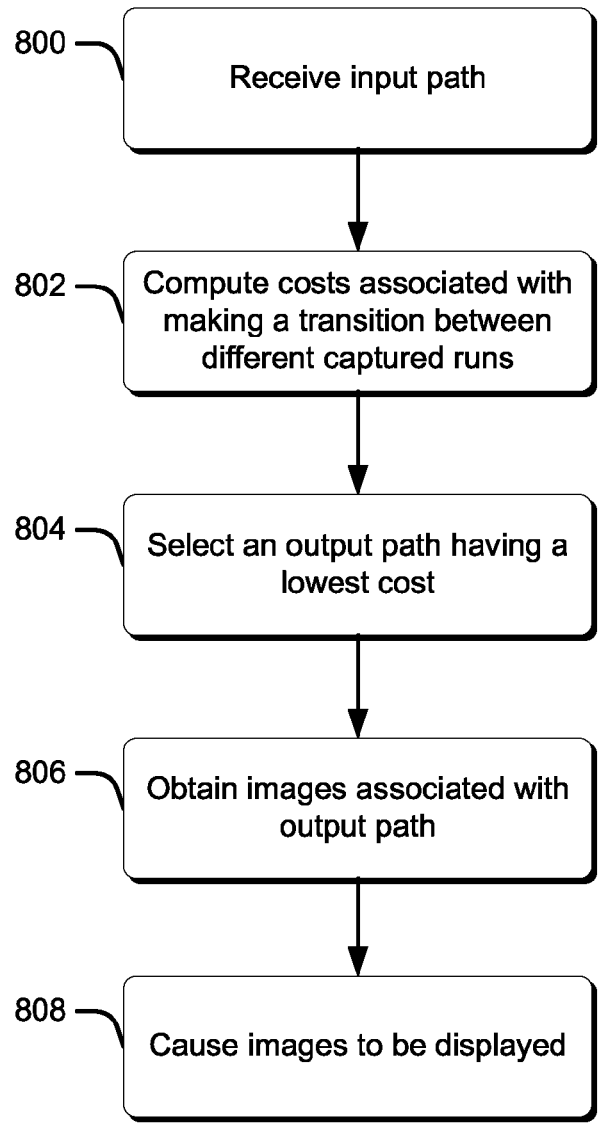
FIG. 8 is a flow diagram that describes steps in a method in accordance with one or more embodiments.

FIG. 8 is a flow diagram that describes steps in a method in accordance with one or more embodiments. The method can be implemented in connection with any suitable hardware, software, firmware, or combination thereof. In at least some embodiments, the method can be implemented by software, such as that executing in connection with a web browser, such as web browser 108 in FIG. 1. It is to be appreciated and understood that various steps of the method can be performed by a local client, a server, or a combination of both.

Step 800 receives an input path. This step can be performed in any suitable way. For example, in at least some embodiments, a user-specified path can be received by way of user input that is received through a Web browser such as Web browser 108 in FIG. 1. Specifically, a user may move their mouse along a path displayed in a suitably-configured user interface, such as user interface 109 in FIG. 1. Other ways, such as those mentioned above, can be utilized to provide an input path. Step 802 computes costs associated with making a transition between different captured runs. Examples of costs and captured runs are provided above. Step 804 selects an output path having a lowest cost. This step can be performed in any suitable way, examples of which are provided above. Step 806 obtains images associated with a selected output path. This step can be performed in any suitable way. For example, in at least some embodiments, the images can be maintained in a database associated with a server. Responsive to selecting an output path in step 804, images associated with the output path can be returned from the server to a local client device. Step 808 causes images obtained in step 806 to be displayed. These images can constitute any suitable type of images. For example, the images can be associated with different capture events including capture events from different captured runs effective to provide a transition between the runs. The transition between the runs can be embodied in the form of a turn from one direction to another direction.

Figure 9:
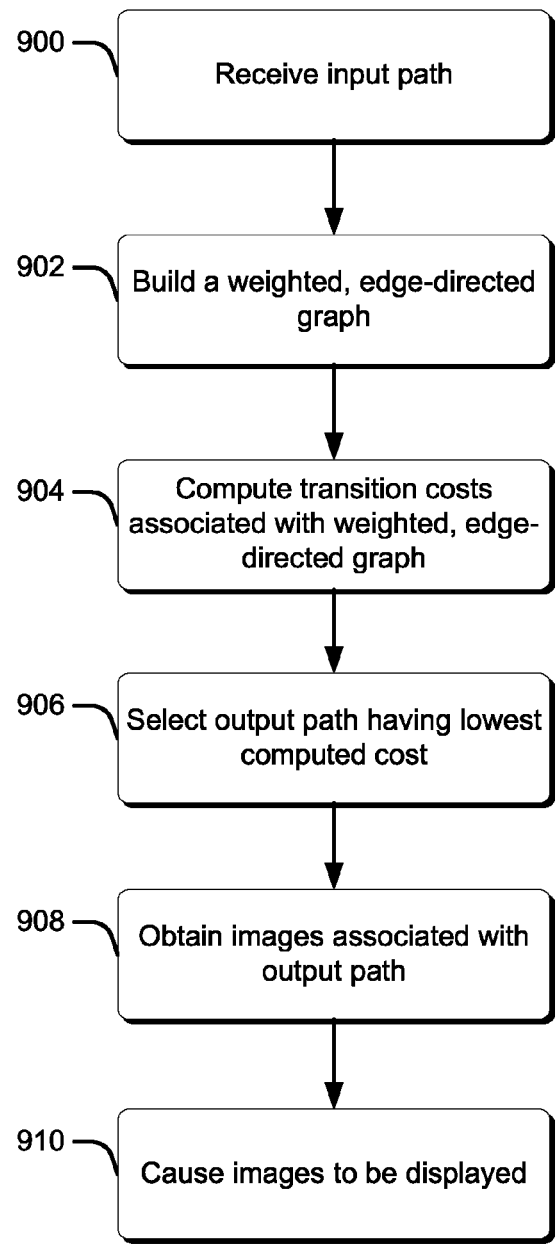
FIG. 9 is a flow diagram that describes steps in a method in accordance with one or more embodiments.

FIG. 9 is a flow diagram that describes steps in a method in accordance with one or more embodiments. The method can be implemented in connection with any suitable hardware, software, firmware, or combination thereof. In at least some embodiments, the method can be implemented by software, such as that executing in connection with a web browser, such as web browser 108 in FIG. 1. It is to be appreciated and understood that various steps of the method can be performed by a local client, a server, or a combination of both.

Step 900 receives an input path. This step can be performed in any suitable way. For example, in at least some embodiments, a user-specified path can be received by way of user input that is received through a Web browser such as Web browser 108 in FIG. 1. Specifically, a user may move their mouse along a path displayed in a suitably-configured user interface, such as user interface 109 in FIG. 1. Other ways, such as those mentioned above, can be utilized to provide an input path. For example, a navigation program may calculate a desired path between points on the map. Step 902 builds a weighted, edge-directed graph. Examples of how this can be done are provided above. Step 904 computes transition costs associated with the weighted, edge-directed graph. Examples of how this can be done are provided above. Step 906 selects an output path having the lowest computed cost. Step 908 obtains images associated with a selected output path. This step can be performed in any suitable way. For example, in at least some embodiments, the images can be maintained in a database associated with a server. Responsive to selecting an output path in step 906, images associated with the output path can be returned from the server to a local client device. Step 910 causes images obtained in step 908 to be displayed. These images can constitute any suitable type of images. For example, the images can be associated with different capture events including capture events from different captured runs effective to provide a transition between the runs. The transition between the runs can be embodied in the form of a turn from one direction to another direction.

Figure 10:
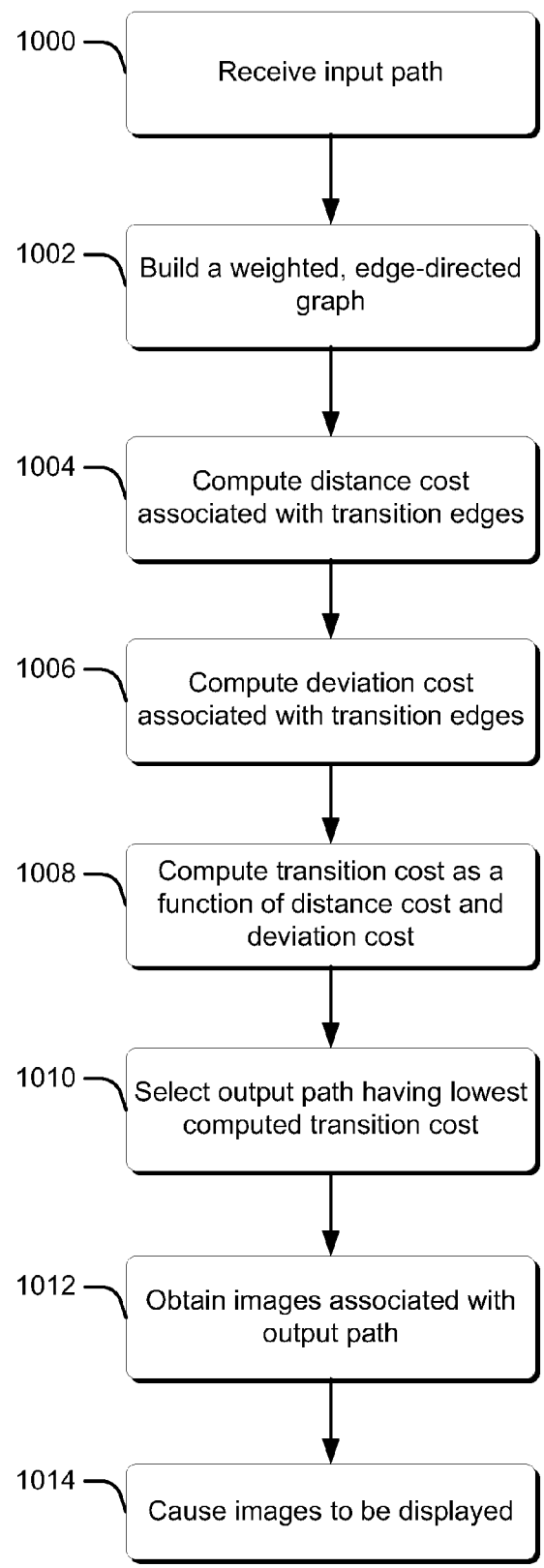
FIG. 10 is a flow diagram that describes steps in a method in accordance with one or more embodiments.

FIG. 10 is a flow diagram that describes steps in a method in accordance with one or more embodiments. The method can be implemented in connection with any suitable hardware, software, firmware, or combination thereof. In at least some embodiments, the method can be implemented by software, such as that executing in connection with a web browser, such as web browser 108 in FIG. 1. It is to be appreciated and understood that various steps of the method can be performed by a local client, a server, or a combination of both.

Step 1000 receives an input path. This step can be performed in any suitable way examples of which are provided above. Step 1002 builds a weighted, edge-directed graph. Examples of how this can be done are provided above. Step 1004 computes a distance cost associated with transition edges within the weighted, edge-directed graph. Examples of how this can be done are provided above. Step 1006 computes a deviation cost associated with the transition edges. Examples of how this can be done are provided above. Step 1008 computes a transition cost, for each transition edge, as a function of the distance cost and the deviation cost. Examples of how this can be done are provided above. Step 1010 selects an output path having the lowest computed transition cost. Step 1012 obtains images associated with a selected output path. This step can be performed in any suitable way examples of which are provided above. Step 1014 causes images obtained in step 1012 to be displayed. These images can constitute any suitable type of images. For example, the images can be associated with different capture events including capture events from different captured runs effective to provide a transition between the runs. The transition between the runs can be embodied in the form of a turn from one direction to another direction.

Having described example methods in accordance with one or more embodiment, consider now a discussion of an example system that can be utilized to implement one or more embodiments.

Example System

Figure 11:
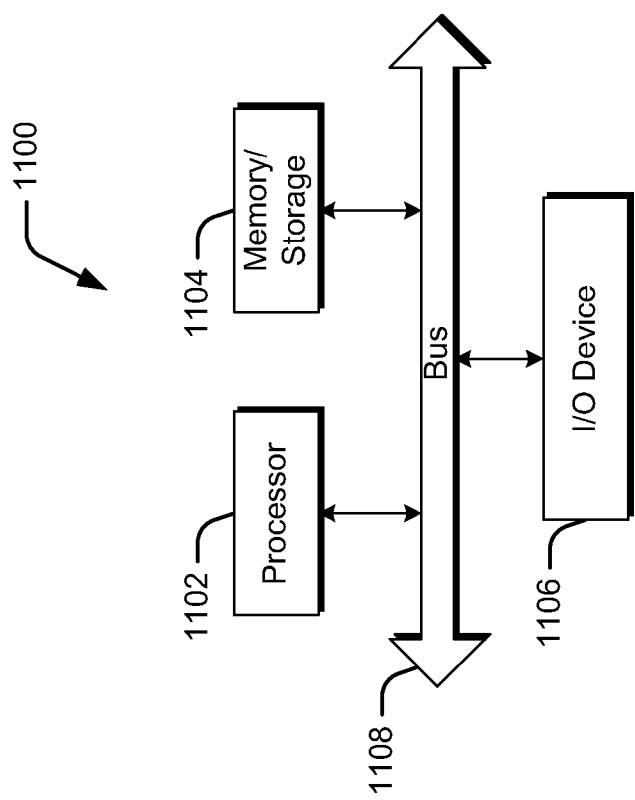
FIG. 11 is a block diagram of a system in accordance with one or more embodiments.

FIG. 11 illustrates an example computing device 1100 that can implement the various embodiments described above. Computing device 1100 can be, for example, computing device 102 of FIG. 1 or any other suitable computing device such as a server that serves as a remote resource, such as remote resource 112 in FIG. 1.

Computing device 1100 includes one or more processors or processing units 1102, one or more memory and/or storage components 1104, one or more input/output (I/O) devices 1106, and a bus 1108 that allows the various components and devices to communicate with one another. Bus 1108 represents one or more of any of several types of bus structures, including a memory bus or memory controller, a peripheral bus, an accelerated graphics port, and a processor or local bus using any of a variety of bus architectures. Bus 1108 can include wired and/or wireless buses.

Memory/storage component 1104 represents one or more computer storage media. Component 1104 can include volatile media (such as random access memory (RAM)) and/or nonvolatile media (such as read only memory (ROM), Flash memory, optical disks, magnetic disks, and so forth). Component 1104 can include fixed media (e.g., RAM, ROM, a fixed hard drive, etc.) as well as removable media (e.g., a Flash memory drive, a removable hard drive, an optical disk, and so forth).

One or more input/output devices 1106 allow a user to enter commands and information to computing device 1100, and also allow information to be presented to the user and/or other components or devices. Examples of input devices include a keyboard, a cursor control device (e.g., a mouse), a touch input device (e.g., a touch screen), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a global approach for computing transitions between captured runs through an intersection. In accordance with one or more embodiments, a transition algorithm receives as input various runs that have been captured through an intersection and an input path through the intersection. The transition algorithm processes its inputs and provides, as an output, a set of points and data such as a direction associated with each of the points. The set of points includes points from different captured runs. The output set of points and associated data indicate which images to obtain from a database and which field of view to create a simulated turn for the user.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method comprising:
   receiving, with a computing device, an input path comprising a computed path for navigating along one or more streets;
   utilizing a transition algorithm to compute an output path associated with the input path, wherein the transition algorithm:
     receives, as input, at least two different captured driving runs, the at least two different captured driving runs being stored in memory, each captured run including a plurality of nodes that represent capture events that were acquired at the plurality of nodes along and during the at least two different captured driving runs, and at least some adjacent nodes on each captured run are connected by weighted edges, and a description of an intersection associated with the input path and the driving runs;
     computes the output path as a function of cost associated with a transition within the intersection between said at least two captured driving runs;
   obtaining images associated with a selected output path; and
   causing obtained images to be displayed for a user.

2. The computer-implemented method of claim 1, wherein each capture event represents a location where a 360° panoramic view was captured.

3. The computer-implemented method of claim 1, wherein the transition algorithm is configured to compute the output path by considering costs associated with transition edges that connect nodes on different captured runs.

4. The computer-implemented method of claim 3, wherein the transition edges are defined between nodes within the intersection.

5. The computer-implemented method of claim 1, wherein the description of the intersection comprises a radius that describes an intersection size.

6. A computer-implemented method comprising:
   receiving, with a computing device, a user-specified path comprising a computed path for navigating along one or more streets;
   computing costs associated with making a transition between different captured driving runs, the different captured driving runs being stored in memory, each captured run including a plurality of nodes that represent capture events that were acquired at the plurality of nodes along and during the different captured driving runs, and at least some adjacent nodes on each captured run are connected by weighted edges, associated with the user-specified path;
   selecting an output path having a lowest cost;
   obtaining images associated with a selected output path; and
   causing obtained images to be displayed for a user.

7. The computer-implemented method of claim 6, wherein said computing costs comprises computing a distance cost and a deviation cost for different transitions between the captured runs.

8. The computer-implemented method of claim 7, wherein:
said distance cost is computed by computing a distance between nodes on the different captured runs; and
said deviation cost is computed by computing an angle associated with individual transitions between nodes on the different captured runs.

9. The computer-implemented method of claim 8, wherein said distance comprises a Euclidean distance between the nodes on the different captured runs.

10. The computer-implemented method of claim 6, wherein said obtaining images comprises obtaining one or more 360° panoramic images.

11. One or more computer-readable hardware storage media embodying computer-executable instructions which, when executed, implement a method comprising:
receiving an input path comprising a computed path for navigating along one or more streets;
building a weighted, edge-directed graph associated with the input path, the weighted, edge-directed graph comprising multiple captured driving runs, the multiple captured driving runs being stored in memory each of which includes multiple nodes that represent capture events that were acquired at the multiple nodes along and during the multiple captured driving runs;
computing transition costs associated with the weighted, edge-directed graph;
selecting an output path having a lowest computed transition cost;
obtaining 360° panoramic view images associated with the output path; and
causing the 360° panoramic view images to be displayed.

12. The one or more computer-readable hardware storage media of claim 11, wherein said computing transition costs comprises computing a distance cost associated with transition edges within the weighted, edge-directed graph.

13. The one or more computer-readable hardware storage media of claim 12, wherein at least some of the nodes occurring within an intersection; and, wherein computing a distance cost comprises computing a Euclidian distance between nodes on different captured runs within the intersection.

14. The one or more computer-readable hardware storage media of claim 11, wherein said computing transition costs comprises computing a deviation cost associated with transition edges within the weighted, edge-directed graph.

15. The one or more computer-readable hardware storage media of claim 14, wherein the weighted, edge-directed graph comprises multiple captured runs each of which includes multiple nodes, at least some of the nodes occurring within an intersection; and, wherein computing a deviation cost comprises computing an angle associated with each transition edge.

16. The one or more computer-readable hardware storage media of claim 11, wherein said computing transition costs comprises computing a distance cost and a deviation cost associated with transition edges within the weighted, edge-directed graph.

17. The one or more computer-readable hardware storage media of claim 16, wherein the weighted, edge-directed graph comprises multiple captured runs each of which includes multiple nodes, at least some of the nodes occurring within an intersection; wherein computing a distance cost comprises computing a Euclidian distance between nodes on different captured runs within the intersection; and, computing a deviation cost comprises computing an angle associated with each transition edge.

18. The one or more computer-readable hardware storage media of claim 17, wherein the obtaining 360° panoramic view images comprises computing a heading for each 360° panoramic view image along the output path.

* * * * *